United States Patent [19]
Merchant

[11] 3,850,511
[45] Nov. 26, 1974

[54] OCULOMETRY SYSTEM EMPLOYING SONIC DETERMINATION OF THE POSITION AND THE DIRECTION OF THE OBSERVER'S HEAD

[75] Inventor: John Merchant, Needham, Mass.

[73] Assignee: Honeywell Inc., Minneapolis, Minn.

[22] Filed: Nov. 1, 1973

[21] Appl. No.: 411,797

[52] U.S. Cl. .................................... 351/7, 351/39
[51] Int. Cl. ............................................. A61b 3/00
[58] Field of Search ......................... 351/1, 6, 7, 39

[56] References Cited
UNITED STATES PATENTS

| | | | |
|---|---|---|---|
| 3,473,868 | 10/1969 | Young et al. ............................ | 351/1 |
| 3,663,098 | 5/1972 | Merchant ................................ | 351/6 |
| 3,664,731 | 5/1972 | Jex .......................................... | 351/1 |
| 3,712,716 | 1/1973 | Cornsweet et al. ..................... | 351/7 |

Primary Examiner—James W. Lawrence
Assistant Examiner—Wm. H. Punter
Attorney, Agent, or Firm—Charles J. Ungemach; Albin Medved; John S. Munday

[57] ABSTRACT

An improved oculometry system in which the user of an oculometer is enabled to move and turn within an eye space to an unprecedented extent, by the use of an ultrasonic measuring system for determining the position and direction of the observer's head, together with accessory computing means and with focusing apparatus, a plurality of servoed mirrors, and a switching mirror actuated thereby.

5 Claims, 3 Drawing Figures

OCULOMETRY SYSTEM EMPLOYING SONIC DETERMINATION OF THE POSITION AND THE DIRECTION OF THE OBSERVER'S HEAD

The invention herein described was made in the course of or under a contract or subcontract thereunder, with the Air Force.

BACKGROUND OF THE INVENTION

This invention relates to the field of optical instruments, and more particularly to apparatus including an oculometer for giving an output definitive of the location of a fixation point which an observer is regarding. An oculometer is an instrument giving an output representative of the direction of the gaze vector of an observer, and oculometers are known in several forms.

FIELD OF THE INVENTION

A remote oculometer including a source of radiation, preferably invisible, to illuminate the eye of an observer who is not physically connected to the instrument. The radiation is projected by suitable projection optics into a region of space, which may be called the eye space, within which the observer's eye must be located. The eye space is imaged, by suitable collection optics in the oculometer, on the screen of an electro-optical sensing device such for example as an image dissector. Associated electronic circuitry analyzes the signals from the sensing device, to detect the presence and location of an eye in the eye space by the presence and relation of signal components characteristic of the pupil-iris boundary and of the corneal reflection of the radiation source. This process is referred to as searching for and acquiring the eye, and when it has been accomplished, azimuth and elevation output signals are supplied which indicate the direction of the gaze vector of the eye, based on the spatial relation between the pupil-iris boundary and the corneal reflection. These signals are thereafter maintained regardless of linear or angular movement of the eye, as long as it remains within the eye space, and this process is known as tracking the eye.

The operation of the oculometer is based on the fact that when the eye is looking directly at the oculometer, the corneal reflection is substantially centered within the pupil-iris boundary, and remains there, even if the observer turns his head, as long as the eye remains in the eye space. This is due to the peculiar physical configuration of the eye and will be discussed more fully in connection with FIG. 3 below. The direction outputs are with respect to a zero of direction represented by the line from the eye to the oculometer, which defines "straight ahead" for that instrument.

The eye space is centered on the optical axis of the instrument: its dimensions transversely and longitudinally with respect to that axis are determined by limitations inherent in the projection and collection optics, which define the field of view and depth of focus of the oculometer. In one successful oculometer of this sort the eye space has a volume of 1 cubic inch.

The foregoing condition obviously limits the utility of an oculometer to applications where the observer's eye can be placed and maintained within the limited eye space of the instrument during use. A first attempt to increase the applicability of the oculometer involved providing accessory apparatus to make the eye space effectively a cubic foot, rather than a cubic inch, the accessory apparatus including means for altering the effective direction of the instrument's optical axis and means for varying the distance of its focal plane. The first means comprised a pair of mirrors located near the oculometer and adjusted by servo motors about horizontal and vertical axes when the eye location approached the lateral limit of the eye space, as sensed within the instrument by displacement of the image from the center of an electro-optical detector, in effect moving that small space transversely within the larger one in accordance with the transverse component of movement of the eye. The second means comprised circuitry to detect any out-of-focus condition of the image at the detector and to position an adjustable focusing lens to restore the sharpness of the image, again displacing the eye space, this time longitudinally, within the larger space as the eye moved toward or away from the oculometer.

SUMMARY OF THE INVENTION

While a cubic foot of eye space gives the user much more freedom than before, there is still a serious limitation on the usage of the oculometer, in that only about 60° of azimuth coverage is available because of the anatomy of the human head and eye. Many applications of the oculometer, on the other hand, require that the user be able to view through an azimuth range of up to 180° or even more.

It is a principle object of the present invention to provide apparatus by which the limitations of the oculometer may be still further relaxed, to permit substantially unlimited rotation of the observer's head. This is accomplished by making available a plurality of angularly spaced alternative directions of the optical axis of the instrument, with respect to any one of which the direction of the observer's gaze vector can be ascertained.

A further object of the invention is to improve the oculometer system so that its output identifies not merely the direction in space of the observer's gaze vector, but also the actual location of the observer's fixation point or some particular surface being observed.

Various other objects, advantages, and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

Before proceeding further it may be helpful to give an illustration of a situation in which oculometric apparatus is of value. As one example, in the use of a flight trainer a student pilot was having difficulty in making good simulated landings. Oculometric monitoring of his eye movements during the landing procedure revealed that he was neglecting to observe the rate of descent indicator with sufficient frequency. Upon having this called to his attention, and altering his procedure accordingly, he had no further trouble with the problem. Without the oculometer output record it would have been difficult in the first place to pin-point his procedural error, and in the second place to even convince him of its actual existence. One application therefore of the use of my invention is in training apparatus for teaching correct monitoring habits to those who are required to remain aware of a large number of variables reported on an instrument panel, particularly where the changes in different variables have different degrees of urgency under different circumstances.

DESCRIPTION OF THE PREFERRED EMBODIMENT

Figure 1:
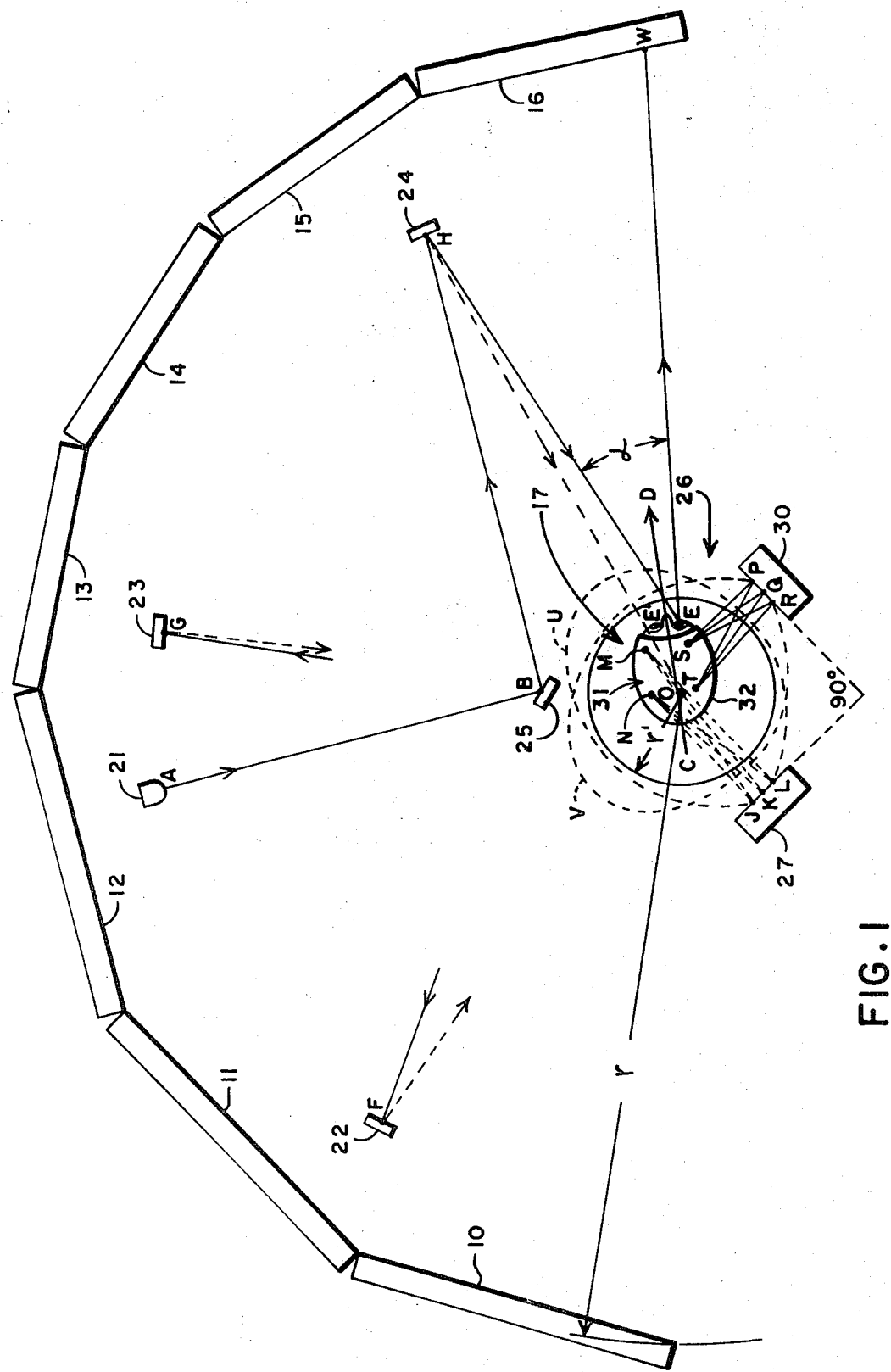
FIG. 1 is a somewhat schematic plan view of an oculometer installation according to my invention.

Turning now to the drawing, in FIG. 1 a display to be observed is shown in plan to comprise a plurality of panels, 10, 11, 12, 13, 14, 15, and 16. They are shown for convenience as comprising sides of an irregular polygon circumscribed by a circle of radius $r$, but this arrangement is not indispensible. An observer 17 is located near the center 0 of the circle, and must be allowed freedom of both linear and angular motion, within the volume of space represented in section by a smaller circle of radius $r'$ which may also have 0 as its center. The observer's eyes are shown at E and E': he is, of course, free to use his binocular vision. Panels 10–16 are convenient vertical extent and are mounted at a convenient distance above the floor, depending on whether observer 17 is to be seated or standing.

Apparatus according to my invention is to be used to indicate and if desired to record the fixation points of the observer as he performs his monitoring function.

To determine the instantaneous direction of the observer's gaze vector a remote oculometer 21 is provided, which can conveniently be rigidly suspended from the ceiling of the working area at a point A. The optical axis of the oculometer is fixed and extends therefrom in the direction AB, and the instrument includes servo means for varying its focus over a reasonably wide range.

Supported at known points F, G, and H, not necessarily equidistant from O, are a plurality of servo mirrors 22, 23, and 24: a switching mirror 25 is supported at point B. Switching mirror 25 may be actuated, as will presently be described, into first, second, and third positions, in which the optical axis AB is extended to servo mirror 24, to servo mirror 23, or to servo mirror 22 respectively. Each of the servo mirrors is adjusted by servo motors about elevation and azimuth axes. The normal position of each of these mirrors in azimuth is that in which the optical axis from point B is further extended to pass through point O, as shown for example by the broken line ABHO. In elevation the normal positions of the servo mirrors are those in which the extended axis passes through the work space at the mean level of the observer's eye.

Also included in the invention is a dual ultrasonic measuring system identified by the general reference numeral 26 and comprising a pair of transmitter assemblies 27 and 30 and a receiver assembly 31. Each transmitter assembly includes a triad of coplanar ultrasonic transmitters in a triangular arrangement, the planes of the assemblies being substantially vertical and mutually defining a dihedral angle of substantially 90°. Assembly 27 includes transmitters J, K and L, and is located generally behind the observer and to his left: assembly 30 includes transmitters P, Q, and R and is located generally behind the observer and to his right.

Receiver assembly 31 comprises a helmet 32 worn by the observer and carrying a first pair of ultrasonic receivers M and N, for cooperating with transmitter assembly 27, and a second pair of ultrasonic receivers S and T, for cooperating with transmitter assembly 30, receivers M and S being to the front and receivers N and T being to the rear. The "head direction" CD of the observer is the direction of an axis of the helmet when the observer is facing straight ahead. The line joining points N and M and that joining points T and S are parallel to the head direction axis. Points S and T and points M and N are preferably the same distance apart.

In the copending patent application of Donald J. Rotier, Ser. No. 346,560, filed Mar. 30, 1973, and assigned to the assignee of the present application, there is clearly disclosed an ultrasonic head positioning measurement system corresponding to elements P, Q, R, S, T, or elements J, K, L, M, N, and the detailed mathematics underlying such a system will not be repeated here. In brief outline by way of example, transmitter P emits a pulse of ultrasonic energy at a known time, and the times at which the pulse is received at S and T are observed: transmitter Q and transmitter R then emit pulses in turn, and the times of arrival of these pulses are also observed, after which the cycle is repeated. The elapsed times for signals from the transmitters to the receivers, the speed of sound being measured or known, are measures of the distances between the transmitters and the receivers: these six measurements, together with the known mutual spacings of the receivers and of the transmitters, are sufficient to define the location of points S and T in a local Cartesian system having its origin at R for example and its axes extending vertically, normal to the plane of the transmitters, and generally forward in that plane, respectively. The azimuth and elevation of the line TS (and hence of CD) are likewise obtainable in the same coordinates.

It is clear that in the situation shown in FIG. 1 receivers N and M are occluded from receiving significant signals from transmitters J, K, and L by interposition of the mass of helmet 31. As the observer turns his head through somewhat less than 180° it first occurs that receivers N and M are enabled to receive signals from transmitters J, K, and L, and then that receivers S and T are disabled to receive signals from transmitters P, Q, and R: it is thus evident that a dual measuring system is necessary if the positions of at least two points on the helmet, and the head direction of the wearer, are to be determinable at all times.

The area within which at least a useful level of ultrasonic signal can be received from transmitter assembly 27 is generally indicated in horizontal section by the curve U, and that for signals of the same level for transmitter assembly 30 is similarly indicated in horizontal section by the curve V. Thus whatever the location and angulation of helmet 31 within the area common to curves U and V, the position and direction determinations can readily be made.

The function of each of mirrors 22–25 is to bring the optical axis of the oculometer to the observer's eye. To accomplish this a principal three-dimensional Cartesian coordinate system is set up with its Z-axis vertical through O, its Y-axis extending horizontally in the direction OB, and its origin at a fixed level, preferably common with the origins of the local Cartesian systems for transmitter assemblies 27 and 30. In this principal coordinate system the coordinates of points A, B, F, G, H, J, K, L, P, Q, and R can be accurately determined by measurement. From this the directions of lines FO, GO, and HO can readily be computed. Now if the azimuth of CD, determined by measuring system 26 in the local coordinate system and transformed to the principal coordinate system, is most nearly parallel to that of OH, mirror 25 is switched to the position shown in FIG. 1. If the azimuth of CD is most nearly that of the line OG, mirror 25 is switched to the position where the oculometer axis is extended from B to G, and if the azimuth of CD is most nearly that of OF, mirror 25 is switched to the position where the oculometer axis is extended from B to F. The range of azimuth adjustment available at each of the servo mirrors is sufficient to include the entire working area.

The location of the observer's eyes with respect to helmet 32 may also be accurately determined by measurement. While it is true that there is a very pronounced apparent movement of the pupil in the observer's head, this is effectively a rotary motion about a substantially stationary center within the eyeball, and the position of the center is a matter of physiological knowledge. The coordinates of the center are hence determinable in the principal Cartesian system, as are those of the receivers, by transformation of coordinates, and from this the direction of the line HE may easily be calculated. If this direction is not in agreement with HO, mirror 24 is servo-adjusted in azimuth until the optical axis of the oculometer is established as the broken line ABHO, thus determining the correction angle EHO.

The line EH is "straight ahead" as far as the oculometer is concerned, and the azimuth output of the instrument is based on the angle $\alpha$ between the observer's gaze vector and the line EH. For example, if the observer is fixating at a point W on panel 16 the azimuth output of the oculometer is representative of the angle HEW and must be corrected by the angle EHB to relate to the known direction OH.

Although mirrors 22 and 23 are not optically operative at this time in the oculometer, because of the setting or mirror 25, they nevertheless are both servoed at all times so that the oculometer axis, if impinging upon them, would in each case be reflected to the point E. As the observer turns or moves his head the coordinates for point E change, and all three servo mirrors are continuously adjusted accordingly. Similarly, the elevation servo motors maintain all three servo mirrors directed at the same eye elevation. It follows that if the observer turns his head so far that CD becomes more nearly parallel to OG than to OH, mirror 25 can be switched to its second position and no irregularity of output from the oculometer will occur even though the angle output is measured now from the line GE rather than from the line HE.

The fact that the coordinates of points A, B, F, G, and H are known and the coordinates of E are ultrasonically determined means that the total distance from A to E is always calculable regardless of the path followed. The focusing lens of the oculometer may then be adjusted accordingly, and oculometer focus is retained as the observer moves.

The primary interest in a system as shown in FIG. 1 is not the angle $\alpha$ and its elevational counter part, but the location of the fixation point W. Any point on a panel can be defined by its coordinates in an auxiliary system lying in the panel, and the equations for the planes defining the panels in the principal coordinate system may be determined by measurement. Then since the location of point E and the direction of EW are known, the coordinates of point W in the auxiliary coordinate system can readily be computed. These coordinates constitute the output of the system, and may be presented or recorded numerically or pictorially by any suitable apparatus selected at the choice of the designer.

Figure 2:
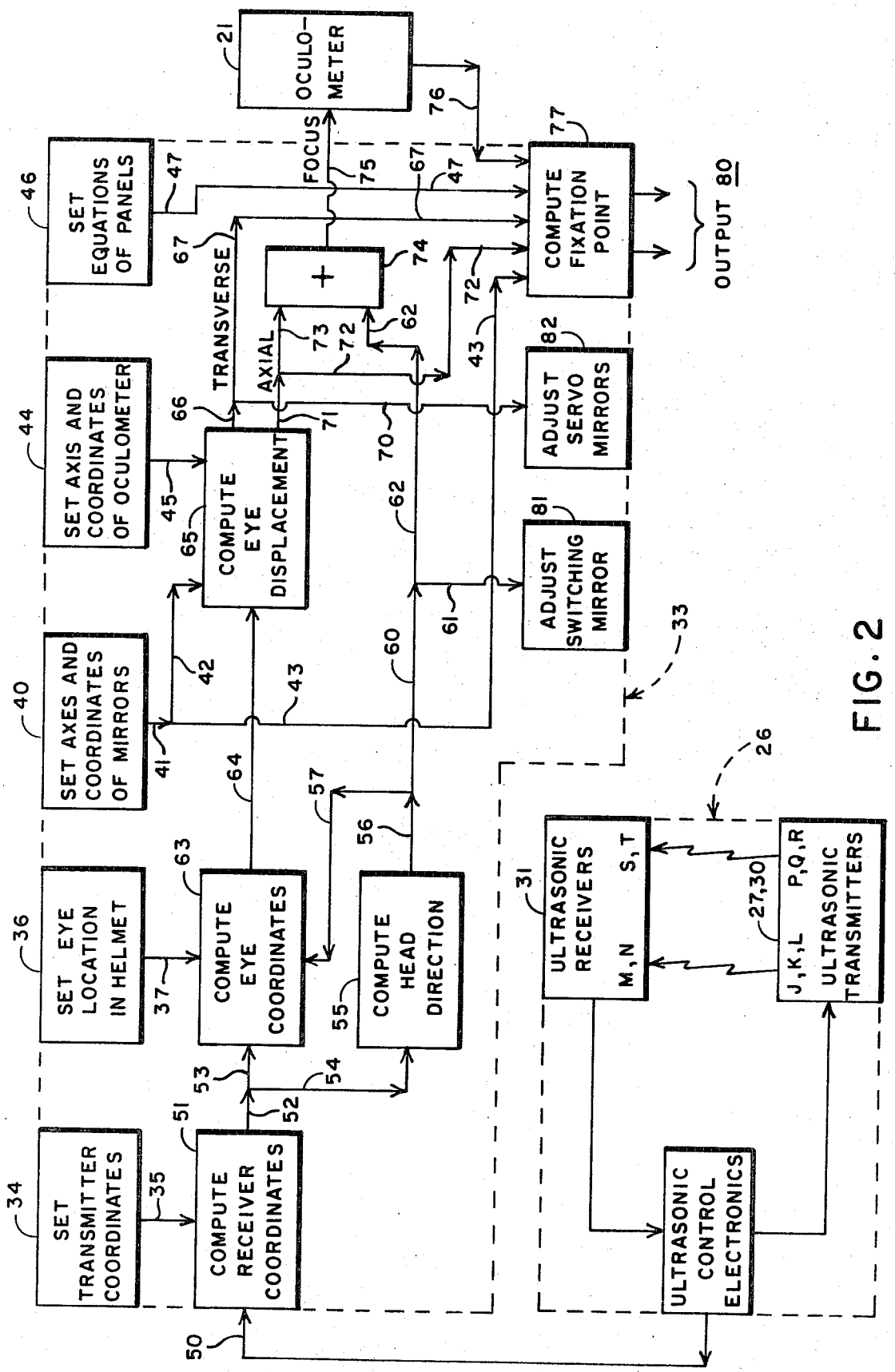
FIG. 2 is a simple functional diagram of the system shown in FIG. 1.

FIG. 2 is a simple block diagram showing the functioning of the system as a whole. Measuring system 26 and oculometer 21 cooperate with a computer 33 having means 34 for supplying inputs 35 representative of the coordinates of transmitters J, K, L, P, Q, and R, means 36 for supplying inputs 37 representative of the displacement of the observer's eye with respect to the receivers M, N, S, and T in helmet 32, means 40 for supplying inputs 41, 42, and 43, representative of the coordinates of mirrors 22–25 and of the equations of lines OF, OG, and OH, means 44 for supplying input 45 representative of the coordinates of oculometer 21 and the equation of its axis AB, and means 46 for supplying inputs 47 representative of the equations of the planes of panels 10–16. All the coordinates mentioned above are in terms of the principal coordinate system. The ultrasonic measuring system 26 supplies at 50 the transit times of energy from each of transmitters J, K, and L to each of receivers M and N, and from each of transmitters P, Q, and R to each of receivers S and T.

Computer 33 functions as follows, all coordinates being in the principal system unless otherwise stated:

at 51 it computes from coordinate inputs 35 and transient time inputs 50 the coordinates of receivers M, N, S, and T, and supplies them as signals at 52, 53, 54;

at 55 it computes from coordinate signals 54 the observer's head direction, and supplies it as signals at 56, 57, 60, 61, 62;

at 63 it computes from coordinate signals 53, head direction input 57, and eye location inputs 37 the coordinates of the observer's eye, and supplies them as signals at 64;

at 65 it computes from coordinate signals 64 and inputs 42 and 45 the transverse displacements of the eye from HO, GO, and FO, and the axial displacements HE, GE, and FE of the eye from the oculometer: the transverse displacements are supplied as signals at 66, 67, 70, and the axial displacements are supplied as signals at 71, 72, 73;

at 74 it combines signals 62 and 73 in an adder, and supplies their sum at 75 to actuate the focus adjustment of oculometer 21, which gives an output signal at 76;

at 77 it computes from signals 43, 47, 67, 72, and 76 the coordinates of the observer's fixation point, in the auxiliary coordinate system of the panel which is being observed, and supplies them as the system output 80, which can be fed to any desired indicating or recording device such as a cathode ray oscilloscope or an X – Y plotter.

Signals 61 actuate means 81 for adjusting the position of switching mirror 25, and signals 70 actuate means 82 for adjusting the positions of servo mirrors 22, 23, and 24. By these procedures the oculometer has been adjusted so that the critical cubic inch of space required for correct operation includes the eye of the observer. It will be appreciated that the solution of the acutal three-dimensional geometry problem is rather lengthy, but it presents no unusual complications to the computer designer, and no invention is asserted to lie in any of the equations or computer algorithms.

Figure 3:
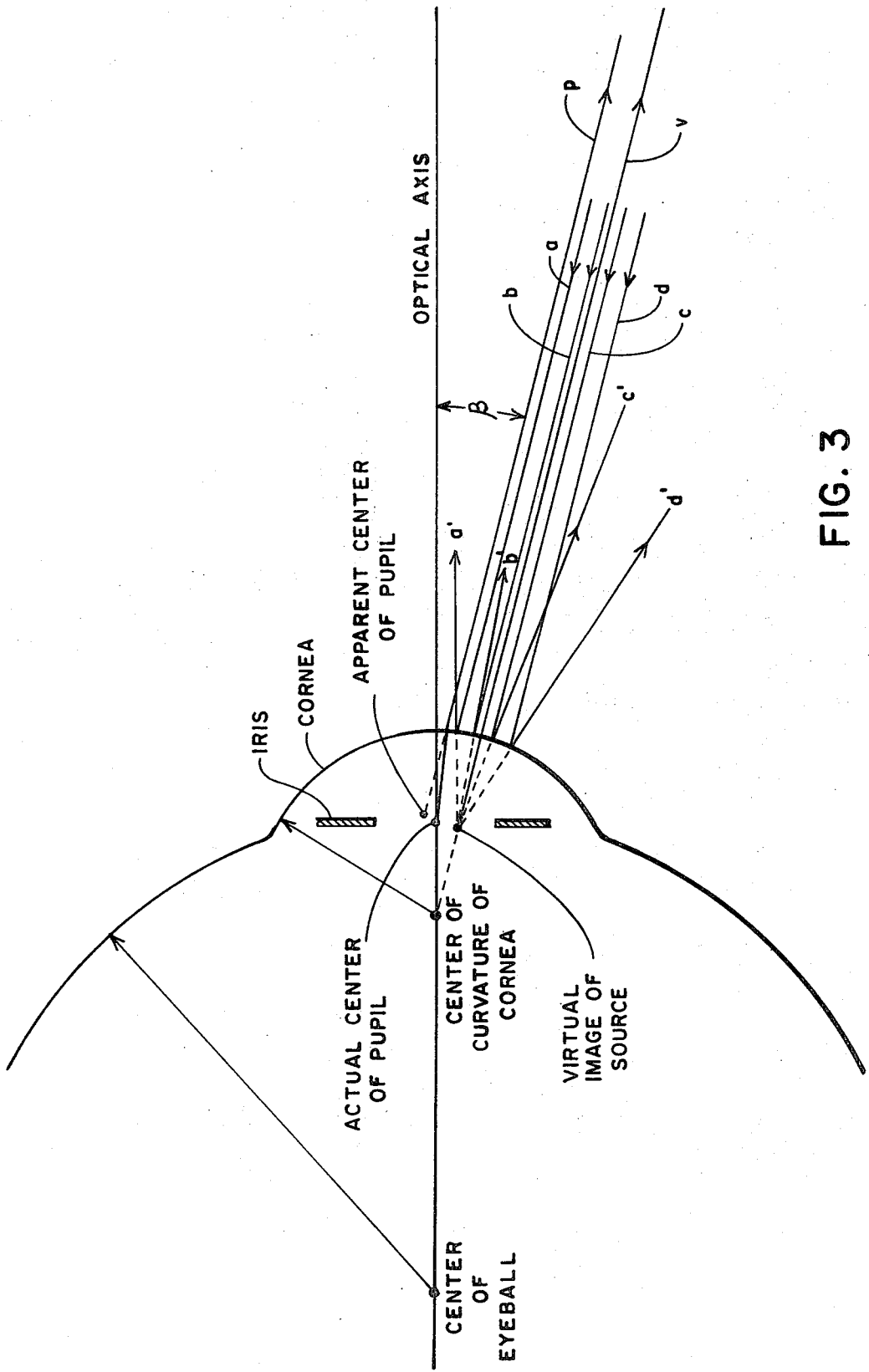
FIG. 3 is a sketch showing the eye of an observer using the oculometer.

For the sake of completeness FIG. 3 is added to give a basis for understanding the principle underlying the oculometer. As shown schematically in that figure, the central portion of the cornea of the eye is a regular, slightly protuberant, high quality, outwardly convex surface, behind which is located the pupil, defined by the inner edge of the iris. The cornea is essentially transparent, but has a small reflection factor of about 3 percent. The pupil is approximately circular, and dilates or contracts with decrease or increase in the intensity of the visible light reaching the eye. The crystaline lens, which images external objects on the retina, is located behind the pupil: neither the lens nor the retina is shown in the figure to avoid unnecessary complexity. The eyeball includes retina, lens, iris, and cornea, and rotates as a unit about a substantially fixed center in the eye socket as the observer varies his gaze vector. The optical axis of the eye extends from the center of the eyeball through the center of the pupil to the object being regarded. To change his gaze vector the observer may rotate his eye in its socket, or turn his head, or do both in any proportions.

It is well known that when a beam of parallel light falls on a regular convex reflecting surface, a virtual image of the light appears. If such a beam were directed along the optical axis in FIG. 3 from the right, the virtual image would lie on the axis, and hence would appear to coincide with the center of the pupil. In the figure the beam is shown as made up of parallel oblique rays $a$, $b$, $c$, and $d$, from a suitable source, which are in part reflected as at $a'$, $b'$, $c'$, and $d'$, respectively, and the virtual image, from the direction of the source, is located at the end of the line $v$. The center of the pupil is similarly located at the end of the line $p$: its apparent position is slightly displaced therefrom because of refraction in the cornea, but this factor is small. For small values of angle $\beta$ it can be neglected, and if necessary a correction for its value can be calculated and applied.

The position of the center of the pupil may be computed automatically since the circumference of the pupil is known. It has not been found that noncircularity of the pupil, or changes in the location of its center with accommodation of the crystaline lens or dilation or contraction of the pupil, introduces any untoward complications.

Consideration of FIG. 3 will make it apparent that the transverse displacement between lines $v$ and $p$ is a measure, by its direction and magnitude, of the departure of the observer's gaze vector from the optical axis. It will also be observed that small lateral displacements of the observer's head, without rotary displacement, will not change the relation between lines $v$ and $p$ except to the extent that the displacement between the apparent and the real pupil centers is changed due to the different point on the cornea at which line $p$ traverses it. As pointed out above, this effect has been found to be nominal.

It will of course be appreciated that the relationship between lines $v$ and $p$ must be adjusted by the distance from the oculometer to the eye, because the greater that distance, the small will be the apparent displacement of the corneal reflection from the center of the pupil from a given angular rotation of the eye.

The oculometer supplies energy beam $a$, $b$, $c$, $d$ in the near infrared wave length band, which is not annoying to the user, and which does not affect appreciably the diameter of the pupil. The oculometer receives energy along lines $p$ and $v$ and gives an output representative of the amount and direction of any displacement between them. For the special case where the observer is looking directly at the oculometer, lines $p$ and $v$ coincide. If the observer is focusing on the oculometer, the transmitted components of rays $a$, $b$, $c$, and $d$, are focused on the retina and "seen," as if he is focusing on something nearer or further than the oculometer, rays $a$, $b$, $c$, and $d$ are not in focus at the retina and are seen in blurred outline, if at all.

The foregoing description and drawing are illustrative of my invention, which I now claim as follows:

1. Apparatus for determining the fixation point, of an observer free to move and turn within a substantial volume of observation space, on a surface at least partially surrounding said space, comprising, in combination:
   an oculometer, including focus adjusting means, having an optical axis and giving an output representative of the transverse and axial displacement of the observer's gaze vector from the axis;
   adjustable mirror means for extending said axis into said observation space from each of a plurality of nominal directions spaced in azimuth therearound;

means for determining the location of the observer's eye in said observation space and adjusting said nominal directions of said mirror means so that said axis when extended in each direction reaches the observer's eye;
   means for determining the observer's head direction and further adjusting said mirror means to select the one of said nominal directions most nearly aligned therewith;
   means for determining the axial displacement of the observer's eye from said oculometer and adjusting the focus of the oculometer in accordance therewith; and
   means modifying the output of said oculometer in accordance with the first named adjustment of said mirror means and with said axial displacement, to determine the gaze vector of the observer.

2. Apparatus for determining the fixation point, of an observer free to move and turn within a substantial volume of observation space, on a surface at least partially surrounding said space, comprising, in combination:
   an oculometer, including focus adjusting means, having an optical axis and giving an output representative of the lateral displacement of the observer's gaze vector from the axis;
   adjustable mirror means for extending said axis into said observation space from each of a plurality of nominal directions spaced in azimuth therearound;

means for determining the location of the observer's eye in said observation space and adjusting said nominal directions of said mirror means so that said axis when extended in each direction reaches the observer's eye;

means for determining the observer's head direction and further adjusting said mirror means to select the one of said nominal directions most nearly aligned therewith;

means for determining the axial displacement of the observer's eye from said oculometer and adjusting the focus of the oculometer in accordance therewith;

means modifying the output of said oculometer in accordance with the first named adjustment of said mirror means and with said axial displacement, to determine the gaze vector of the observer; and means determining the point of intersection of said gaze vector with said surface.

3. Apparatus for continuously giving an output representative of the gaze vector of an observer who is free to move and turn within an observation volume located generally centrally of a field of view comprising, in combination:

a fixed oculometer having an optical axis directed generally toward said observation volume and giving an output representative of the angular displacement between said axis and the gaze vector of an observer looking generally along said axis toward said oculometer;

means determining the head direction of the observer and the location of his eye, in said observation volume, in a system of coordinates in which the location of said oculometer is known;

a plurality of servoed mirrors angularly spaced around said observation volume at fixed positions whose coordinates are known, and including servo motor means for angular adjustment thereof;

switching mirror means located on said axis at a fixed point whose coordinates are known, and actuable into a plurality of discrete positions in which said axis is extended by reflection to fall respectively on individual mirrors of said plurality for further reflection thereby toward the observation volume;

means for actuating said switching mirror to the one of said positions which extends said axis to that servo mirror whose direction from said observation volume is closest to the observer's head direction, and means for continuously adjusting all said servoed mirrors, in accordance with the coordinates of said mirrors and said eye, into positions adapted to extend said axis by reflection from said mirrors to said eye, whereupon the output of said oculometer is continuously a measure of the deviation of the observer's gaze vector from line of determinable direction with respect to said coordinates, regardless of the extent through which said observer turns or moves within said observation volume.

4. Apparatus according to claim 3 together with measn determining, from the position of the switching mirror and the coordinates of the oculometer, the mirrors, and the observer's eye, the distance of the eye from the oculometer; and means adjusting the focus of said oculometer in accordance with the distance so determined.

5. Apparatus according to claim 3 in which the first named means comprises a plurality of fixed, mutually spaced ultrasonic transmitters having known coordinates in said system, a plurality of spaced ultrasonic receivers mounted on the observer's head in known fixed spatial relationship to his observing eye, means measuring the transit times of energy pulses from said transmitters to said receivers, and means computing the coordinates of the observer's eye from said times and the coordinates and spatial relationship of said transmitters.

* * * * *